(12) United States Patent
Sakurada

(10) Patent No.: US 11,186,287 B2
(45) Date of Patent: Nov. 30, 2021

(54) CANT ESTIMATING METHOD, CANT ESTIMATING APPARATUS, AND NON-TRANSITORY COMPUTER-READABLE STORAGE MEDIUM STORING PROGRAM

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 16/359,506

(22) Filed: Mar. 20, 2019

(65) Prior Publication Data

US 2019/0299998 A1   Oct. 3, 2019

(30) Foreign Application Priority Data

Mar. 29, 2018 (JP) .............................. JP2018-065883

(51) Int. Cl.
| | | |
|---|---|---|
| *B60W 40/072* | (2012.01) | |
| *B60W 40/107* | (2012.01) | |
| *B60W 40/114* | (2012.01) | |
| *B60W 40/105* | (2012.01) | |
| *B62D 6/00* | (2006.01) | |

(52) U.S. Cl.
CPC ........ *B60W 40/072* (2013.01); *B60W 40/105* (2013.01); *B60W 40/107* (2013.01); *B60W 40/114* (2013.01); *B62D 6/002* (2013.01)

(58) Field of Classification Search
CPC ............. B60W 40/072; B60W 40/107; B60W 40/114; B60W 40/105; B60W 50/0098; B60W 2050/0056; B60W 2520/10; B60W 2520/125; B60W 2520/14; B60W 2540/18; B60W 40/076; B62D 6/002; B62D 6/04

See application file for complete search history.

(56) References Cited

U.S. PATENT DOCUMENTS

| | | | | |
|---|---|---|---|---|
| 5,627,756 A | | 5/1997 | Fukada et al. | |
| 5,676,433 A | * | 10/1997 | Inagaki .................. | B60T 8/172 303/146 |
| 2009/0299546 A1 | * | 12/2009 | Hac ......................... | B60T 8/172 701/1 |

(Continued)

FOREIGN PATENT DOCUMENTS

| | | |
|---|---|---|
| JP | H08-040232 A | 2/1996 |
| JP | 2007-022169 A | 2/2007 |

(Continued)

OTHER PUBLICATIONS

English_Translation_JP2016120882A (Year: 2016).*

*Primary Examiner* — Peter D Nolan
*Assistant Examiner* — Ashley L Redhead, Jr.
(74) *Attorney, Agent, or Firm* — Oliff PLC

(57) ABSTRACT

A cant estimating method of estimating a cant of a travelling road of a vehicle includes a step of acquiring vehicle information including information on a speed, a lateral acceleration, a steering angle, a yaw rate, and a position of each of a plurality of vehicles including a first vehicle, a step of estimating a cant of a travelling road of the first vehicle based on the vehicle information, and a step of storing the estimated cant, in association with information on the position of the first vehicle, in a cant angle database usable by the plurality of vehicles.

6 Claims, 4 Drawing Sheets

(56) References Cited

U.S. PATENT DOCUMENTS

| | | | |
|---|---|---|---|
| 2017/0160745 A1* | 6/2017 | Lauffer | B60W 30/18 |
| 2018/0141570 A1* | 5/2018 | Kimura | B60W 40/08 |
| 2020/0273435 A1* | 8/2020 | Shibata | G02B 27/0179 |

FOREIGN PATENT DOCUMENTS

| | | | |
|---|---|---|---|
| JP | 2016120882 | * | 7/2016 |
| JP | 2017-171225 A | | 9/2017 |

* cited by examiner

CANT ESTIMATING METHOD, CANT ESTIMATING APPARATUS, AND NON-TRANSITORY COMPUTER-READABLE STORAGE MEDIUM STORING PROGRAM

INCORPORATION BY REFERENCE

The disclosure of Japanese Patent Application No. 2018-065883 filed on Mar. 29, 2018 including the specification, drawings and abstract is incorporated herein by reference in its entirety.

BACKGROUND

1. Technical Field

The present disclosure relates to a cant estimating method, a cant estimating apparatus, and a non-transitory computer-readable storage medium storing a program.

2. Description of Related Art

In recent years, it has been required to reduce so-called vehicle deviation, in which a vehicle that should travel straight ahead is prone to deviate from its original path due to a cant on a travelling road. For example, Japanese Unexamined Patent Application Publication No. 2007-22169 (JP 2007-22169 A) discloses a vehicle control apparatus that learns a cant state of the travelling road based on a teacher signal associated with a travelling lane of the vehicle.

SUMMARY

Here, a technology disclosed in JP 2007-22169 A relates to the learning of travelling information. Thus, in the technology of JP 2007-22169 A, there is room for improvement in accuracy in estimating a cant state of a travelling road on which a vehicle travels for the first time. Further, Japanese Unexamined Patent Application Publication No. 08-40232 (JP 08-40232 A) discloses a cant compensation of a lateral acceleration detected in a behavior control of a subject vehicle. Further, Japanese Unexamined Patent Application Publication No. 2017-171225 (JP 2017-171225 A) discloses a method of eliminating a disturbance through low-pass filter processing in a behavior control of a subject vehicle. However, the technologies disclosed in JP 08-40232 A and JP 2017-471225 A do not make it possible to generate information on a cant of a travelling road usable by a plurality of vehicles.

The present disclosure provides a cant estimating method, a cant estimating apparatus, and a non-transitory computer-readable storage medium storing a program, capable of generating, with high accuracy, information on a cant of a travelling road usable by a plurality of vehicles.

A cant estimating method according to a first aspect of the present disclosure estimates a cant of the travelling road of a vehicle. The cant estimating method includes a step of acquiring vehicle information including information on speeds, lateral accelerations, steering angles, yaw rates, and positions of a plurality of vehicles including a first vehicle, a step of estimating the cant of the travelling road of the first vehicle based on the vehicle information, and a step of storing the estimated cant, in association with information on position of the first vehicle, in a cant angle database usable by the plurality of vehicles.

The vehicle information may be processed through low-pass filtering before a step of estimating the cant of the travelling road of the first vehicle.

When the travelling road of the first vehicle is determined to be a curved road, the cant of the travelling road of the first vehicle may be estimated using a turning radius which is calculated based on the vehicle information.

The cant estimating method may include a step of calculating a target steering angle of the first vehicle based on the cant angle database.

A cant estimating apparatus according to a second aspect of the present disclosure is configured to estimate a cant of a travelling road of a vehicle. The cant estimating apparatus includes a processor configured to acquire vehicle information including information on speeds, lateral accelerations, steering angles, yaw rates and positions of a plurality of vehicles including a first vehicle and estimate the cant of the travelling road of the first vehicle, based on the vehicle information, and a storage unit configured to store the estimated cant, in association with information on position of the first vehicle, in a cant angle database usable by the plurality of vehicles.

A third aspect of the present disclosure relates to a non-transitory computer-readable storage medium storing a program. The program includes instructions to cause a computer to acquire vehicle information including information on speeds, lateral accelerations, steering angles, yaw rates, and positions of a plurality of vehicles including a first vehicle, estimate a cant of a travelling road of the first vehicle based on the vehicle information, and store the estimated cant, in association with information on position of the first vehicle, in a cant angle database usable by the plurality of vehicles.

With each aspect of the present disclosure, it is possible to generate, with high accuracy, information on a cant of a travelling road usable by a plurality of vehicles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram illustrating a cant angle of a travelling road, a lateral acceleration, and the like.

DETAILED DESCRIPTION OF EMBODIMENTS

Driving Support System

Figure 1:
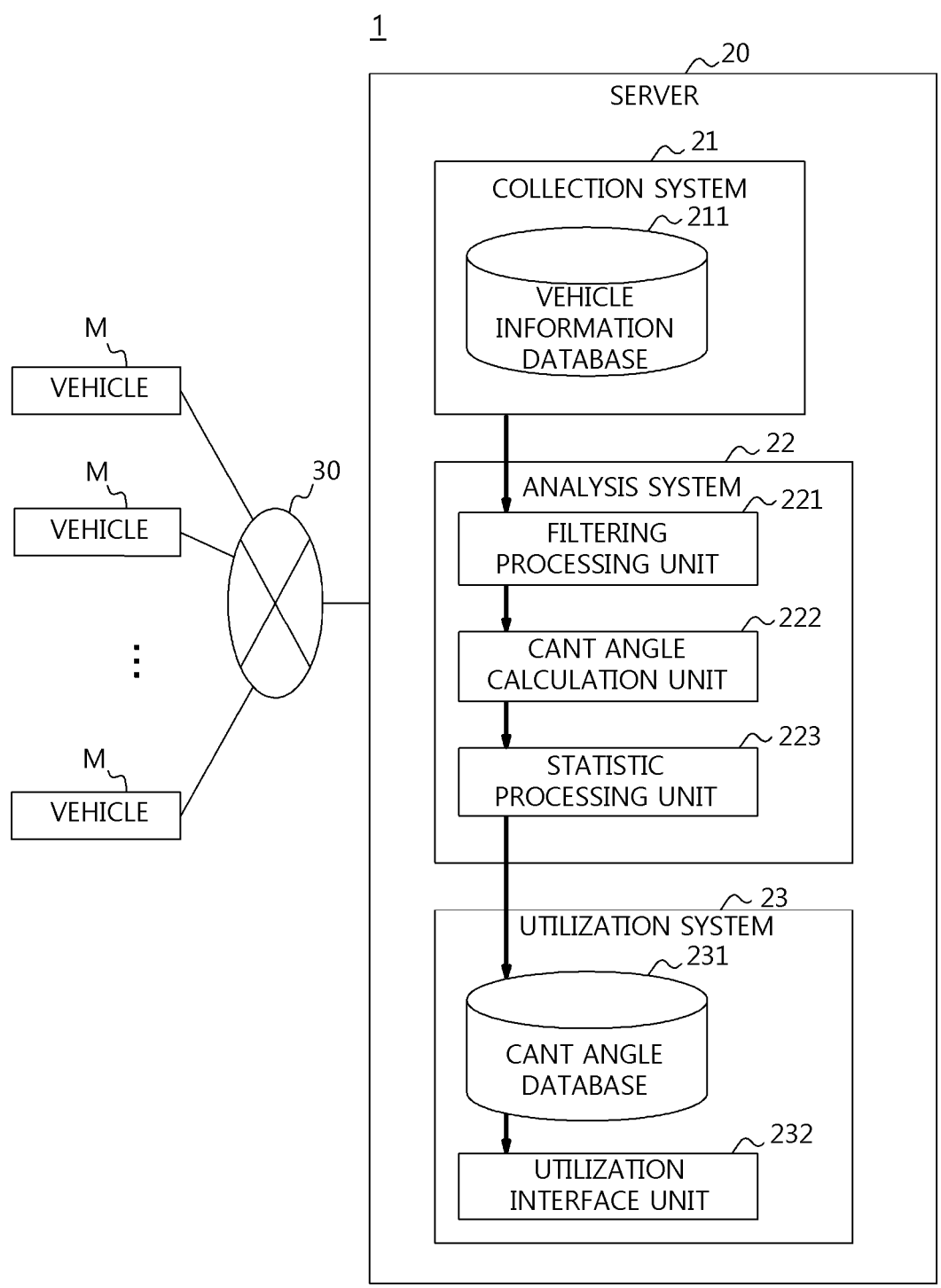
FIG. 1 is a schematic diagram illustrating a configuration of a driving support system.

FIG. 1 is a diagram illustrating a schematic configuration of a driving support system 1. The driving support system 1 includes a plurality of vehicles M and a server 20 configured to perform a cant estimating method according to one embodiment of the present disclosure. Here, a cant is generally provided on the surface of a road (a travelling road) on which a vehicle M, such as an automobile, travels, such that the side of the road is lowered. For this reason, when the vehicle M travels straight, vehicle deviation may occur due to the cant. Further, when the vehicle M makes a turn, in addition to a lateral force due to the turning, a lateral force due to the cant may act on the vehicle body. The driving support system 1 includes, as described below, a cant angle database 231 that includes information on a cant of a travelling road. The information included in the cant angle database 231 can be utilized by a vehicle M performing autonomous driving, and a vehicle M using steer-by-wire technology, to realize smooth travelling and turning.

The server 20 may include one server device or a plurality of server devices capable of communicating with each other. The server 20 communicates with the plurality of vehicles M. The server 20 may be installed, for example, in a management center that collects and analyzes information on the vehicle M. The server 20 can acquire information on, for example, speeds, lateral accelerations, steering angles, yaw rates and positions from the plurality of vehicle M. A detailed configuration of the server 20 will be described below.

The vehicles M may include, for example, automobiles or any other vehicles. Hereinbelow, when one vehicle M (a subject vehicle) is distinguished from other vehicles, the vehicle M may be referred to as a first vehicle M. The vehicle M includes an information processing apparatus capable of communicating with the server 20. The information processing apparatus is, for example, an in-vehicle apparatus, such as a navigation apparatus. The information processing apparatus includes a display unit, such as a display, that displays information to a user, and an input unit that receives input from the user. The input unit of the information processing apparatus is, for example, a touch panel, and may be integrated with the display unit to constitute a touch panel display. The user can set a destination through the input unit while, for example, viewing a map displayed on the display unit. The vehicle M may have, for example, an autonomous driving function for travelling to the set destination. Further, the information processing apparatus includes a receiver that receives a signal from a Global Positioning System (GPS) satellite. The information processing apparatus can calculate a current position based on a signal received by the receiver, and transmit the calculated current position to the server 20 as position information. The position information is, for example, latitude and longitude.

In addition, the information processing apparatus mounted on the vehicle M includes a communication interface of a Controller Area Network (CAN). The information processing apparatus can acquire information other than position information from a steering Electronic Control Unit (ECU) via the CAN, and transmit the acquired information to the server 20. The steering ECU acquires detected values from, for example, a wheel speed sensor detecting the rotating speed of a wheel, a lateral acceleration sensor detecting an acceleration in the lateral direction (i.e., the width direction of a vehicle) acting on the subject vehicle, a steering angle sensor detecting a steering angle of a steering wheel, and a yaw rate sensor detecting a rotating angular velocity (a yaw rate) around the vertical axis of the subject vehicle. The steering ECU generates information on the speed, the lateral acceleration, the steering angle, and the yaw rate from the detected values. Further, the information processing apparatus can transmit a target steering angle calculated based on the cant angle database 231 (to be described below) to the steering ECU via the CAN.

The vehicle M and the server 20 are communicably connected via a network 30. The network 30 includes, for example, the internet, but may include any other network.

Configuration of Server

As illustrated in FIG. 1, the server 20 includes, as functional blocks, a collection system 21, an analysis system 22, and a utilization system 23.

The collection system 21 includes a database including information that the server 20 collects from the vehicle M. In the present embodiment, the database provided in the collection system 21 is a vehicle information database 211.

The vehicle information database 211 includes vehicle information on the plurality of vehicles M. In the present embodiment, the vehicle information includes information on the speeds, the lateral accelerations, the steering angles, the yaw rates, and the positions. In the vehicle information database 211, each vehicle M is distinguished, for example, by a unique identification (ID). In the vehicle information database 211, the vehicle information is stored in association with the ID of the vehicle M.

The vehicle information database 211 and the cant angle database 231 (to be described below) are stored in a storage unit of the server 20 (hereinafter referred to as a server storage unit). The server storage unit includes one or more memories. Each memory included in the server storage unit may function as, for example, a main storage device, an auxiliary storage device, or a cache memory. Further, the server storage unit stores map information. The map information is information on a road map for vehicles, including, for example, road links and intersections. Here, a road link is a segment of a road divided by an intersection or the like.

The vehicle information database 211 and the cant angle database 231 are managed by a control unit of the server 20 (hereinafter referred to as a server control unit). Specifically, the server control unit, for example, changes (updates), adds, and deletes information included in the vehicle information database 211 and the cant angle database 231. The server control unit includes one or more processors. The processor may include, for example, a general-purpose processor, and a processor dedicated to a specific process. Further, the server control unit not only manages the vehicle information database 211 and the cant angle database 231, but also performs a cant estimating method (to be described below) and controls the operation of the entire server 20.

The information in the vehicle information database 211 can be acquired from the vehicle M via a communication unit of the server 20 (hereinafter referred to as a server communication unit) and the network 30. Further, the server communication unit can transmit the information in the cant angle database 231 to the vehicle M. The server communication unit includes one or more communication interfaces corresponding to any given communication standard. For example, the server communication unit may include a communication interface corresponding to each of a wired Local Area Network (LAN) standard, a wireless LAN standard, and the like.

The analysis system 22 includes a filtering processing unit 221, a cant angle calculation unit 222, and a statistical processing unit 223.

The filtering processing unit 221 acquires the vehicle information on the plurality of vehicles M including the first vehicle M, and performs a process to eliminate the influence of disturbances. In the present embodiment, the filtering processing unit 221 uses low-pass filtering. Here, the disturbances influencing the vehicle information is, for example, a crosswind and a road surface disturbance. The influence of the crosswind or the road surface disturbance on the vehicle information changes in a short time. Therefore, by processing the vehicle information through the low-pass filtering, it is possible to efficiently eliminate the influence of the disturbances. Here, the natural frequency of sprung mass of a passenger car is generally known to be approximately 1 Hz. In the present embodiment, the filtering processing unit 221 analyzes the frequency of the acquired vehicle information, and cuts off frequency components higher than 1 Hz. Further, the filtering processing unit 221 replaces the vehicle information processed through the low-pass filtering with an approximate function of time "t", that is, the acquired information associated with time, and outputs the acquired information to the cant angle calculation unit 222.

The cant angle calculation unit 222 calculates a cant angle $\gamma$ of the travelling road of the first vehicle M, based on the vehicle information (information associated with time "t") acquired from the filtering processing unit 221. Details of the calculation of the cant angle calculation unit 222 will be described below. The cant angle calculation unit 222 expresses the calculated cant angle $\gamma$ as a function ($\gamma(t)$) of time "t." The cant angle calculation unit 222 correlates $\gamma(t)$ with information on the travelling road of the first vehicle M at time "t", in other words, the position information, and outputs correlation information to the statistical processing unit 223. Here, the cant angle calculation unit 222 calculates the cant angle $\gamma$, based also on the vehicle information of other vehicles M that have passed the travelling road of the first vehicle M. The cant angle calculation unit 222 calculates, for example, a plurality of cant angles $\gamma$ for each road link of the travelling road of the first vehicle M, and outputs the calculated cant angles $\gamma$ to the statistical processing unit 223.

The statistical processing unit 223 statistically processes the plurality of the cant angles $\gamma$ acquired from the cant angle calculation unit 222. The statistical processing may be performed for each segment of the travelling road (for example, for each road link). In the present embodiment, the statistical processing unit 223 calculates, by statistical processing, an average value and a standard deviation of the cant angles $\gamma$.

Here, the statistical processing unit 223 may set a condition on a result of the statistical processing such that the data of the cant angle database 231 (to be described below) is updated when the condition is satisfied. The condition, for example, may be that the standard deviation of the plurality of cant angles $\gamma$ is equal to or less than a threshold value. When the standard deviation of the plurality of cant angles $\gamma$ is equal to or less than the threshold value, the statistical processing unit 223 may cause the data of the cant angle database 231 to be updated with the average value of the plurality of cant angles $\gamma$. In addition, when the condition is not satisfied, the statistical processing unit 223 may adjust the plurality of cant angles $\gamma$. For example, when the influence of a crosswind blowing for a long time is considered, the statistical processing unit 223 may uniformly adjust the plurality of cant angles $\gamma$. Further, the statistical processing unit 223 may adjust the plurality of cant angles $\gamma$ by excluding a cant angle $\gamma$ which has a value greatly different from the values of the other cant angles $\gamma$. After adjusting the plurality of cant angles $\gamma$ as above, the statistical processing unit 223 may perform the statistical processing again.

The utilization system 23 includes the cant angle database 231 and a utilization interface unit 232.

The cant angle database 231 stores information on the cant angle $\gamma$ for each segment of the travelling road (road) of the vehicle M. The cant angle $\gamma$ included in the cant angle database 231 is estimated by the above statistical processing (for example, averaging) in the analysis system 22. In the cant angle database 231, the cant angle $\gamma$ is stored in association with the corresponding segment of the travelling road of the vehicle M.

The utilization interface unit 232 transmits necessary information to the system that utilizes (uses) the information on the cant angle $\gamma$ stored in the cant angle database 231. For example, a transmission destination may be an elevation map management unit in an autonomous driving system. The utilization interface unit 232 transmits the information on the cant angle $\gamma$, associated with the segment of the travelling road of a vehicle M, to the elevation map management unit. The elevation map management unit generates and manages an elevation map to which information necessary for controlling the autonomous driving of the vehicle M (in particular, steering angle control and vehicle attitude control) is added. For example, the elevation map generated by the elevation map management unit may be provided to the information processing apparatus or the steering ECU of the vehicle M. For example, the vehicle M performing autonomous driving can perceive the inclination of a road surface on the travelling road based on the elevation map, thereby making a smooth cornering and maintaining an appropriate vehicle attitude. Here, the autonomous driving system may be mounted on the vehicle M. Accordingly, the vehicle M can provide the vehicle information for calculation of the cant angle $\gamma$, and, at the same time, receive the information on the cant angle $\gamma$ estimated based on the vehicle information of other vehicles M.

Further, the transmission destination of the information of the utilization interface unit 232 may be a weather information collection system. As described above, when the influence of a crosswind is considered, the statistical processing unit 223 of the analysis system 22 adjusts the cant angle $\gamma$. Here, the statistical processing unit 223 may store information on the crosswind (for example, information on a wind speed and a wind direction associated with time) as additional information in the cant angle database 231. The utilization interface unit 232 then transmits the information on the crosswind to the weather information collection system. The weather information collection system, for example, may be installed in a highway management center, and thereafter used to, for example, warn the vehicle M, travelling in the same segment, of the crosswind. Further, the autonomous driving system may acquire the crosswind information. Based on the crosswind information, when it is determined that the crosswind is blowing more strongly than a predetermined level (for example, a wind velocity of 10 m/s) in the travelling road, the autonomous driving system may prompt a driver to switch from autonomous driving to manual driving. Here, when the cant angle database 231 stores the crosswind information, the statistical processing unit 223 may acquire the vehicle information on the first vehicle M and the vehicle information on a vehicle travelling in the opposite direction, and calculate information such as wind speed and wind direction information. In the vehicle information on the vehicle travelling in the opposite direction, the disturbance caused by the influence of the crosswind occurs in a direction opposite to the disturbance to the first vehicle M based on the travelling direction. For the above reason, by, for example, subtracting a component of the direction of the crosswind based on the vehicle information of the first vehicle M and the vehicle information of the vehicle travelling in the opposite direction, it is possible to calculate crosswind information with higher accuracy.

Here, the filtering processing unit 221, the cant angle calculation unit 222, the statistical processing unit 223, and the utilization interface unit 232 can be implemented by the server control unit. The server control unit may implement functions of the filtering processing unit 221, the cant angle calculation unit 222, the statistical processing unit 223, and the utilization interface unit 232 by loading a program stored in the server storage unit and executing the program.

Cant Angle Calculation

Figure 2:
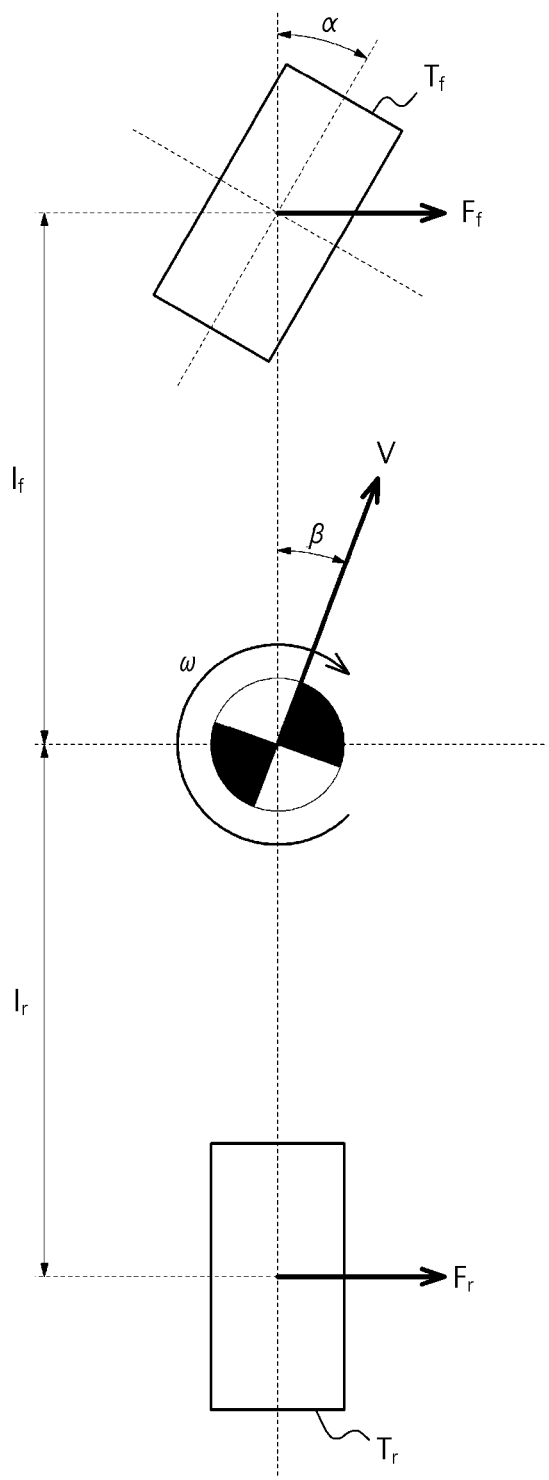
FIG. 2 is a diagram of a vehicle model.

FIG. 2 illustrates a model of the vehicle M used in the present embodiment. The vehicle M is, in many cases, actually four-wheeled, but in the present embodiment, a two-wheeled model with a simplified configuration is used. The model of the vehicle M in FIG. 2 is viewed from the top and includes a front wheel $T_f$, a rear wheel $T_r$, and a yaw center (a circle colored in black and white). Further, $l_f$ represents a distance between the yaw center and the front wheel $T_f$, and $l_r$ represents a distance between the yaw center and the rear wheel $T_r$. In the example of FIG. 2, the model of the vehicle M is turning at a speed V. Here, $\alpha$ is a front wheel steering angle, $\beta$ is a vehicle slip angle, and $\omega$ is a yaw rate. In addition, $F_f$ is a force acting on the front wheel $T_f$ (a front wheel cornering force), and $F_r$ is a force acting on the rear wheel $T_r$ (a rear wheel cornering force).

For the model of the vehicle M illustrated in FIG. 2, the following equation (1) is established from a balance of centrifugal force:

$$m \times a = m\{V \times (\omega + \partial \beta / \partial t)\} = F_f + F_r \qquad \text{Equation (1)}$$

Here, "a" is the lateral acceleration of the vehicle M, and "m" is the mass of the vehicle M.

For the model of the vehicle M illustrated in FIG. 2, the following equation (2) is established from a balance of a yaw moment:

$$I \times \omega = l_f \times F_f - l_r \times F_r \qquad \text{Equation (2)}$$

Here, "I" is a vehicle yaw moment of inertia of the vehicle M.

In general, the yaw rate $\omega$ and the vehicle slip angle $\beta$ are functions of a speed V and a front wheel actual steering angle $\alpha_0$. Accordingly, the yaw rate $\omega$ and the vehicle slip angle $\beta$ can be replaced with the following equations (3) and (4), using functions $A(V)$ and $B(V)$ of the speed V, respectively:

$$\omega = A(V) \times \alpha_0 \qquad \text{Equation (3)}$$

$$\beta = B(V) \times \alpha_0 \qquad \text{Equation (4)}$$

Here, the front wheel actual steering angle $\alpha_0$ is a steering angle of the front wheel $T_f$ based on an actual measurement, which is calculated based on information on the steering angle of the steering wheel of the vehicle M (part of the vehicle information). Further, the lateral acceleration "a" is also a function of the speed V and the front wheel actual steering angle $\alpha_0$.

By equations (1) to (4), the lateral acceleration "a" can be replaced with the following equation (5):

$$a = V\{A(V) + \partial B(V)/\partial t\} \times \alpha_0 \qquad \text{Equation (5)}$$

Figure 3:
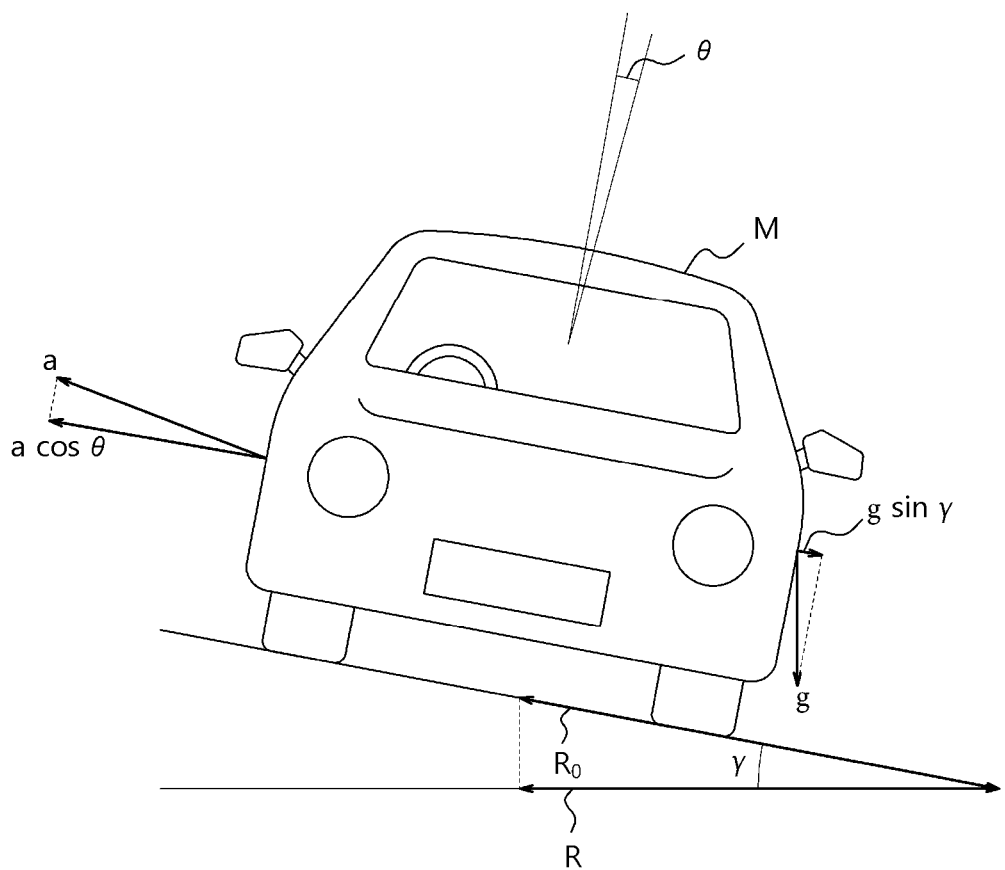

Here, FIG. 3 illustrates a front side (a side facing the travelling direction) of the travelling vehicle M. Further, in FIG. 3, a cross-sectional view of the travelling road of the vehicle M is illustrated. The angle formed by the travelling road of the vehicle M and the horizontal ground surface is the cant angle $\gamma$. In addition, the lateral acceleration "a" illustrated in FIG. 3 corresponds to a theoretical lateral acceleration "a" of the vehicle M in the above equation (5).

As illustrated in FIG. 3, in an actual road environment, the cant angle $\gamma$ is set on the road surface. For this reason, an actually measured lateral acceleration $a_0$ of the vehicle M is different from a theoretical lateral acceleration "a." Here, the following equation (6) is established, where "g" represents a gravitational acceleration:

$$g \times \sin \gamma = a - a_0 \qquad \text{Equation (6)}$$

In addition, as illustrated in FIG. 3, in actual travelling, a roll angle $\theta$ can be generated by movement of the vehicle M in the roll direction. The lateral acceleration "a" in equation (6) is a value that has no regard to the roll angle $\theta$. The roll angle $\theta$ is acquired from an actually measured yaw rate $\omega_0$, based on the yaw rate information of the vehicle M (part of the vehicle information), and equation (5), as illustrated in the following equation (7):

$$\theta = \cos^{-1}\{A(V) + \partial B(V)/\partial t\} \times \alpha_0 \omega_0 \qquad \text{Equation (7)}$$

When compensation of the roll angle $\theta$ is considered, equation (6) can be replaced with the following equation (8):

$$g \times \sin \gamma = a \times \cos \theta - a_0 \qquad \text{Equation (8)}$$

As illustrated in FIG. 3 and equation (8), the actually measured lateral acceleration $a_0$ of the vehicle M is calculated by subtracting a component $g \times \sin \gamma$ of the gravitational acceleration from the lateral acceleration $a \times \cos \theta$, which is acquired by compensation of the roll angle $\theta$. The component $g \times \sin \gamma$ is generated due to the cant angle $\gamma$, in the reverse direction of the lateral acceleration $a \times \cos \theta$.

Here, when the vehicle M goes around a curved road, it is possible to acquire the cant angle $\gamma$, based on the ratio between a plane turning radius R on the map and an actual travelling radius $R_0$. Here, the curved road refers to a travelling road that is not straight. The plane turning radius R is acquired from, for example, map information stored in the server storage unit. In other words, the plane turning radius R can be acquired by matching the position information of the vehicle M (part of the vehicle information) with the map information. In addition, the actual travelling radius $R_0$ can generally be calculated from the speed V and the front wheel actual steering angle $\alpha_0$. In other words, the cant angle calculation unit 222 can acquire the plane turning radius R and the actual travelling radius $R_0$, based on the map information, the vehicle information, and the like. Further, as illustrated in FIG. 3, the plane turning radius R is acquired by projecting the actual travelling radius $R_0$ of the vehicle M onto a horizontal surface. Accordingly, the following equation (9) is established:

$$\cos \gamma = R/R_0 \qquad \text{Equation (9)}$$

The cant angle calculation unit 222 can calculate the cant angle $\gamma$ using at least one of the above-described equations (8) and (9). Here, when the vehicle M is travelling on a straight road (a travelling road that is straight), the plane turning radius R and the actual travelling radius $R_0$ become infinite and thus the cant angle calculation unit 222 cannot calculate the cant angle $\gamma$ using equation (9). Accordingly, when the vehicle M is travelling on the straight road, the cant angle calculation unit 222 may calculate the cant angle $\gamma$ using equation (8). In addition, when the vehicle M is travelling on the curved road, the cant angle calculation unit 222 may preferentially use equation (9) rather than equation (8). Moreover, as another example, when the vehicle M is travelling on the curved road, the cant angle calculation unit 222 may calculate the cant angle using equations (8) and (9), and use a value (for example, an average value) computed from the calculated results of equations (8) and (9), as a finally calculated cant angle $\gamma$. In addition, as described above, the cant angle calculation unit 222 calculates the cant angle $\gamma$ using not only the vehicle information of the first vehicle M, but also the vehicle information of other vehicles M. The cant angle γ that satisfies the conditions, after being processed at the statistical processing unit 223, is stored in the cant angle database 231. Due to the above processes, the cant information is generated with high accuracy.

Figure 4:
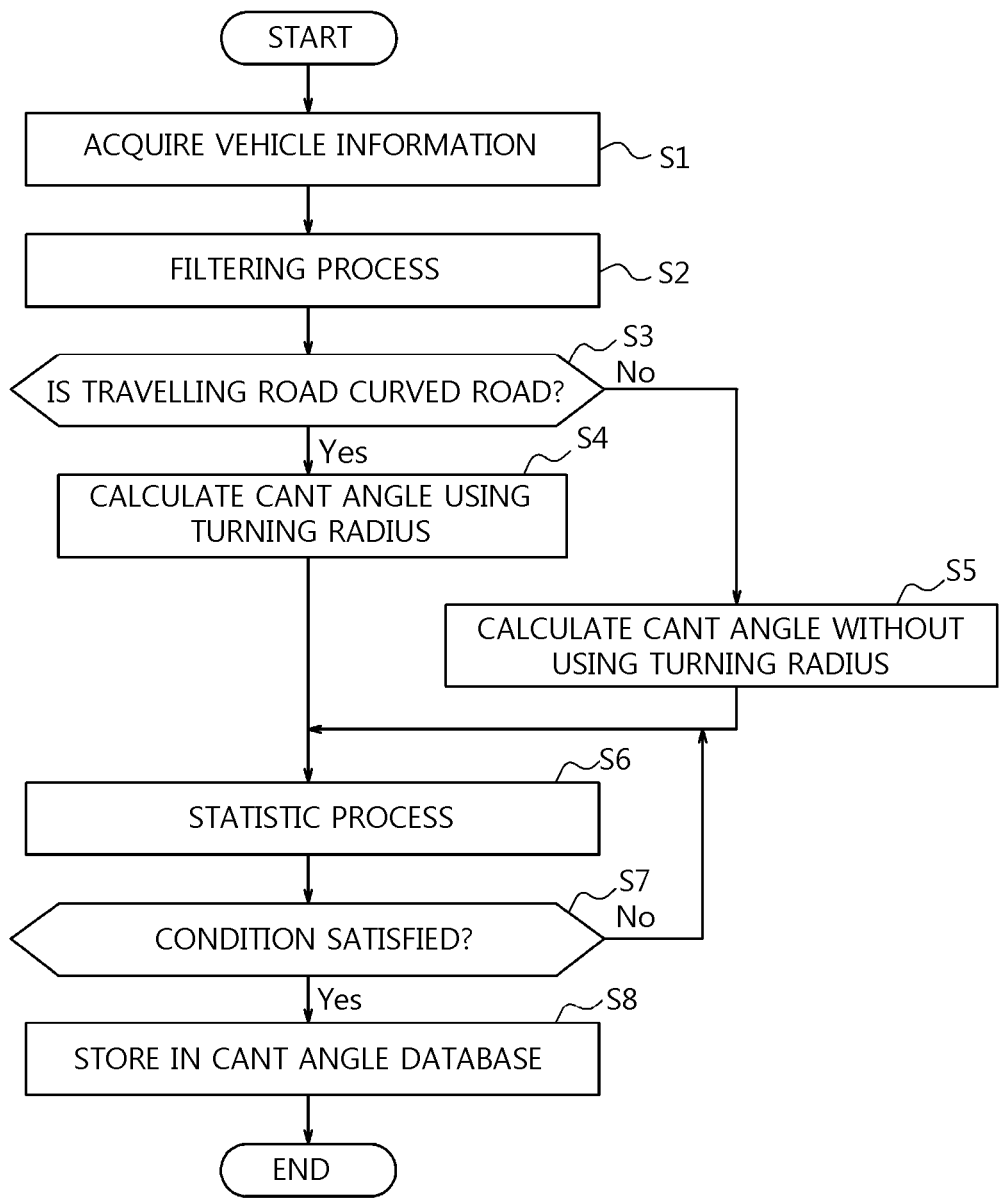
FIG. 4 is a flowchart illustrating a process according to a cant estimating method.

FIG. 4 is a flowchart illustrating exemplified steps of the server 20 (an example of the cant estimating apparatus in the present disclosure) performing the cant estimating method. Among the steps to be described below, steps S2 to S7 correspond to the estimating step of estimating the cant of the travelling road of the first vehicle.

The server 20 acquires the vehicle information on the plurality of vehicles M (step S1). As described above, the vehicle information includes information on the speed, the lateral acceleration, the steering angle, the yaw rate, and the position of the vehicle M.

The server 20 performs a filtering process on the acquired vehicle information (step S2). In the present embodiment, the filtering process processes the vehicle information through the low-pass filtering in order to eliminate the influence of disturbances.

If the server 20 determines that the travelling road, whose cant angle γ is to be calculated, is a curved road (YES in step S3), the server 20 proceeds to step S4. On the other hand, when the server 20 determines that the travelling road, whose cant angle γ is to be calculated, is not a curved road (NO in step S3), the server 20 proceeds to step S5. Here, as described above, the server 20 can determine whether the travelling road is the curved road, based on the position information and the map information of the vehicle M.

When the server 20 determines that the travelling road is a curved road, the server 20 calculates the cant angle γ using a turning radius (step S4). For example, the server 20 can calculate the cant angle γ by equation (9) above that uses the plane turning radius R and the actual travelling radius $R_0$. Here, the server 20 calculates a plurality of cant angles γ, based on the vehicle information of the plurality of vehicles M.

When the server 20 determines that the travelling road is not a curved road, the server 20 calculates the cant angle γ without using the turning radius (step S5). For example, the server 20 can calculate the cant angle γ by equation (8) that does not use the turning radius, rather than by equation (9). Here, the server 20 calculates the plurality of cant angles γ, based on the vehicle information of the plurality of vehicles M.

The server 20 statistically processes the plurality of cant angles γ (step S6). For example, the average value and the standard deviation of the plurality of cant angles γ are calculated.

When the result of the statistical processing satisfies the condition (YES in step S7), the server 20 stores a new cant angle γ(for example, the above-described average value) in the cant angle database 231 (step S8). The server 20 then ends the series of processes. Here, the condition may be, for example, that the standard deviation is equal to or less than a threshold value.

When the result of the statistical processing does not satisfy the condition (NO in step S7), the server 20 adjusts the values of the plurality of the cant angles γ as described above, and then returns to the processing of step S6.

As described above, according to the cant estimating method of the present embodiment, not only the vehicle information of the subject vehicle, but also the vehicle information of other vehicles are acquired, and the cant of the travelling road is estimated. Therefore, even when the subject vehicle is travelling for the first time on the travelling road, by using vehicle information of other vehicles, the cant can be calculated with high accuracy. Further, according to the cant estimating method of the present embodiment, the estimated cant is stored in the cant angle database 231 usable by the plurality of vehicles M, in association with information on position of the vehicle. Accordingly, when the vehicle M using the cant angle database 231, for example, performs autonomous driving, the vehicle M can perceive the exact inclination of the travelling road, thereby making a smooth turn and maintaining an appropriate vehicle attitude.

Further, according to the cant estimating method in the present embodiment, by processing the vehicle information through the low-pass filtering, disturbances can be efficiently eliminated. Here, since the reliability of the vehicle information is enhanced, the accuracy of the estimated cant is also improved.

Further, according to the cant estimating method in the present embodiment, when the travelling road is determined to be a curved road, the cant can be estimated using the turning radius. In other words, when the vehicle M makes a turn, the cant can be estimated using the turning radius, which is not easily influenced by a disturbance caused by a road surface condition. Here, the accuracy of the estimated cant can be further improved. Moreover, when it is determined that the travelling road is not a curved road, the cant can be estimated by a method that does not use the turning radius. Accordingly, it is possible to estimate the cant regardless of whether the travelling road is a straight road or a curved road.

Further, according to the cant estimating method in the present embodiment, the target steering angle can be calculated, based on the cant information of the cant angle database 231, which is estimated with high accuracy. Here, it is possible to increase the accuracy of the steering angle control in an autonomous driving system.

Although the present disclosure has been described based on the drawings and embodiments, it should be noted that it would be easy for a person skilled in the art to make variations and modifications based on the present disclosure. It is therefore to be noted that variations and modifications thereof fall within the scope of the present disclosure. For example, functions or the like included in each element, each step, or the like can be rearranged so as not to be logically contradictory, and it is possible to combine a plurality of elements, steps, or the like into one, or divide these elements, steps, or the like.

What is claimed is:

1. A cant estimating method of estimating a cant of a travelling road of a vehicle, the cant estimating method comprising:
   acquiring vehicle information including information on a speed, a lateral acceleration, a steering angle, a yaw rate, and a position of each of a plurality of vehicles including a first vehicle;
   estimating a cant of a travelling road of the first vehicle, based on the vehicle information, the estimating comprising adjusting cant angles based on crosswind blowing information indicating an amount of crosswind on the traveling road; and
   storing the estimated cant, in association with information on the position of the first vehicle, in a cant angle database usable by the plurality of vehicles.

2. The cant estimating method according to claim 1, wherein the vehicle information is processed through low-pass filtering before estimating the cant of the travelling road of the first vehicle.

3. The cant estimating method according to claim 1, wherein when the travelling road of the first vehicle is determined to be a curved road, the cant of the travelling road of the first vehicle is estimated using a turning radius which is calculated based on the vehicle information.

4. The cant estimating method according to claim 1, further comprising calculating a target steering angle of the first vehicle, based on the cant angle database.

5. A cant estimating apparatus configured to estimate a cant of a travelling road of a vehicle, the cant estimating apparatus comprising:
- a processor configured to acquire vehicle information including information on a speed, a lateral acceleration, a steering angle, a yaw rate, and a position of each of a plurality of vehicles including a first vehicle, and estimate a cant of a travelling road of the first vehicle, based on the vehicle information, the estimating comprising adjusting cant angles based on crosswind blowing information indicating an amount of crosswind on the traveling road; and
- a storage unit configured to store the estimated cant, in association with information on the position of the first vehicle, in a cant angle database usable by the plurality of vehicles.

6. A non-transitory computer-readable storage medium storing a program, wherein the program comprises instructions to cause a computer to:
- acquire vehicle information including information on a speed, a lateral acceleration, a steering angle, a yaw rate, and a position of each of a plurality of vehicles including a first vehicle;
- estimate a cant of a travelling road of the first vehicle, based on the vehicle information, the estimating comprising adjusting cant angles based on crosswind blowing information indicating an amount of crosswind on the traveling road; and
- store the estimated cant, in association with information on the position of the first vehicle, in a cant angle database usable by the plurality of vehicles.

\* \* \* \* \*